United States Patent
Pepka (10) Patent No.: US 9,689,451 B2
(45) Date of Patent: Jun. 27, 2017

(54) TENSION SPRING MOUNT

(75) Inventor: Charles F. Pepka, Bellevue, WA (US)

(73) Assignee: Renton Coil Spring Co., Renton, WA (US)

( * ) Notice: Subject to any disclaimer, the term of this patent is extended or adjusted under 35 U.S.C. 154(b) by 1295 days.

(21) Appl. No.: 12/710,899

(22) Filed: Feb. 23, 2010

(65) Prior Publication Data

US 2011/0204550 A1    Aug. 25, 2011

(51) Int. Cl.
*F16F 1/00* (2006.01)
*F16F 3/04* (2006.01)
*F16F 1/12* (2006.01)

(52) U.S. Cl.
CPC ............... *F16F 3/04* (2013.01); *F16F 1/125* (2013.01); *F16F 2236/06* (2013.01)

(58) Field of Classification Search
USPC ......... 267/73, 138, 289, 290, 174, 168-170, 267/179
See application file for complete search history.

(56) References Cited

U.S. PATENT DOCUMENTS

| | | | |
|---|---|---|---|
| 756,175 A * | 3/1904 | Meisselbach et al. | 177/232 |
| 1,486,295 A | 3/1924 | Mullen | |
| 2,044,649 A | 1/1933 | Swennes | |
| 2,248,447 A | 7/1941 | Wood | |
| 3,030,056 A * | 4/1962 | Rogers | 248/565 |
| 3,039,758 A | 6/1962 | Gratzmuller | |
| 3,178,036 A | 4/1965 | Cardwell | |
| 3,779,537 A | 12/1973 | Kalister | |
| 4,174,099 A * | 11/1979 | Yamasaki | 267/168 |
| 4,197,931 A | 4/1980 | Norcia | |
| 4,254,855 A | 3/1981 | Hildebrand | |
| 4,509,473 A | 4/1985 | Hamparian | |
| 4,538,563 A | 9/1985 | Mayers | |
| 4,645,054 A | 2/1987 | Raab | |
| 4,653,736 A * | 3/1987 | Pontoppidan | 267/70 |
| 4,712,778 A * | 12/1987 | Newman | 267/170 |
| 4,731,902 A * | 3/1988 | Johnston | 16/72 |
| 4,732,372 A | 3/1988 | Dickhart | |

(Continued)

FOREIGN PATENT DOCUMENTS

DE    1713815    7/1955
DE    1127671 B    4/1962
(Continued)

OTHER PUBLICATIONS

PCT International Search Report Dated Jun. 21, 2016; pp. 6.
(Continued)

*Primary Examiner* — Anna Momper
*Assistant Examiner* — Mahbubur Rashid
(74) *Attorney, Agent, or Firm* — Lowe Graham Jones PLLC (57) ABSTRACT

End mounts are used to secure a helical tension spring to end fixtures with various shapes and sizes. These end mounts contain an inner hole to encase the inner spring end mount and secure the end mount making it like a cap. There is also a keyhole created in the top surface that goes through the end mount allowing it to fit over the fixtures but not over the inner end mount, holding it in place. Grooves are machined in a helical pattern on the cylindrical side wall of the end mount. The spring is wound onto the grooves of the end mount.

5 Claims, 8 Drawing Sheets

(56) References Cited

U.S. PATENT DOCUMENTS

| | | | |
|---|---|---|---|
| 4,817,927 A * | 4/1989 | Martin | 267/155 |
| 4,869,473 A * | 9/1989 | Giovanni | 267/74 |
| 5,201,199 A | 4/1993 | Kemper | |
| 6,079,698 A | 6/2000 | Patterson | |
| 7,252,593 B2 | 8/2007 | Kroll | |
| 7,445,553 B2 | 11/2008 | Nakagaito | |
| 7,568,682 B2 | 8/2009 | Seelmann | |
| 8,480,065 B2 | 7/2013 | Halcom | |
| 8,636,271 B2 | 1/2014 | Check | |
| 8,646,356 B2 | 2/2014 | Horie | |
| 2002/0113353 A1 | 8/2002 | Erhardt | |
| 2005/0048263 A1 | 3/2005 | Ford | |
| 2005/0092961 A1 | 5/2005 | Ucman | |
| 2009/0071286 A1 | 3/2009 | Ueno | |
| 2011/0204550 A1 | 8/2011 | Pepka | |

FOREIGN PATENT DOCUMENTS

| | | |
|---|---|---|
| DE | 1908903 | 1/1964 |
| DE | 1908903 U | 1/1965 |
| DE | 3631233 A1 | 3/1988 |
| DE | 8906198 U1 | 9/1990 |
| DE | 4320859 A1 | 1/1994 |
| DE | 102004031867 A1 | 8/2005 |
| DE | 102007011325 A1 | 9/2008 |
| DE | 102011108852 A1 | 1/2013 |
| EP | 1624219 A1 | 2/2006 |
| FR | 1255804 A | 3/1961 |
| FR | 1476682 A | 4/1967 |
| JP | 5129188 U | 8/1948 |
| JP | 50137456 U | 4/1949 |
| JP | 524957 U | 6/1950 |
| JP | 1413227 Y | 6/1969 |
| JP | 06109052 A | 4/1994 |
| JP | 06033967 A | 8/1994 |
| JP | 2009074605 A | 4/2009 |
| WO | 2007118058 A2 | 10/2007 |
| WO | 2011094163 A1 | 8/2011 |

OTHER PUBLICATIONS

PCT International Search Report Dated Aug. 10, 2016; 4 Pages.
PCT International Search Report Dated Jul. 18, 2014; 5 Pages.
Foreign Office Action Dated Aug. 5, 2016; 6 Pages.

* cited by examiner

TENSION SPRING MOUNT

FIELD OF THE INVENTION

This invention relates generally to mounts for springs and, more specifically, to end-mounting tension springs.

BACKGROUND OF THE INVENTION

Nested springs are used for various applications. For example, they can be used in the landing gear of airplanes, or on any type of device for securing fixtures to a relatively moving component. They have been used where reliability is paramount or in some situations to reduce the space envelope required where the spring is mounted.

Often, nested springs are used to avoid single-point failures by providing a redundant system. They replace a single-spring system. In a single-spring system however, when the spring fails, the whole system fails. Having a dual spring system increases the factor of safety. If one spring fails, the other can still properly function for a time until the broken spring is replaced.

Some other examples include throttle return springs, brake return springs, and valve springs.

SUMMARY OF THE INVENTION

The present invention relates to mounts for springs. More specifically, the present invention comprises an end-mount system for tension springs to attach to fixtures in various applications using grooves and spring tension to keep the spring and fixtures secured together. The system comprises an inner spring and end mount along with an outer spring, encasing the inner spring, and outer end mount resting on the inner end mount. These are attached to fixtures on either end, which can differ depending on the application.

In accordance with further aspects of the invention, the end mounts are cylindrical in shape to allow for the helical tension spring to be secured to the end mount by way of being wound onto grooves on the end mount. The inner diameter of the grooves is slightly larger than the coil diameter of the spring. As the spring is tensioned the increased inward forces of the spring hold the spring on the end mount in a fashion similar to a Chinese finger trap. If the spring were free of the end mount these forces would tend to reduce the spring diameter all along the spring.

In accordance with other aspects of the invention, the end mounts have keyholes to fit over end fixtures. The keyholes are shaped so that the end mount fits over the fixture but not over the inner spring and inner end mount. The keyhole can be any shape as long as it fills this purpose.

In accordance with still further aspects of the invention, the fixtures are machined or attached to the inner spring end mount. These fixtures can be a variety of shapes and sizes depending on the application at hand.

In accordance with yet other aspects of the invention, a dual spring system, with an outer spring encasing an inner spring, allows each spring to be reduced in mass and the strength of the system increases greatly. In addition, a measure of safety is added with another spring introduced to the system. The resonate frequency of the combined spring system is also dramatically changed in comparison to a single spring system for the same application. This change in frequency can also be used to increase the safety of the overall system by avoiding dangerous frequency coupling.

As may be appreciated from the foregoing summary, the invention provides a more secure and clean attachment that adds a factor of safety, is reliable in spring attachments without fasteners, and saves weight.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
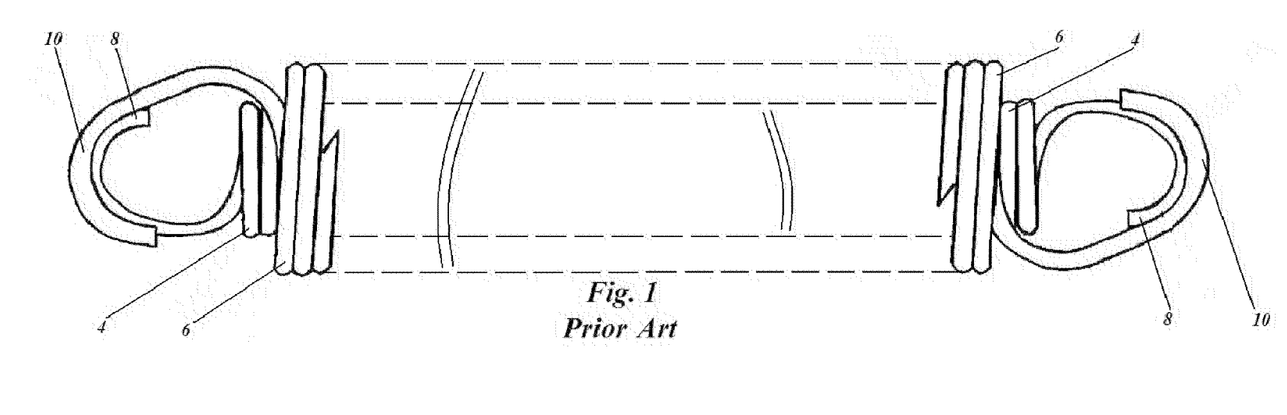
FIG. 1 is a side view of a prior-art nested tension spring arrangement.

As illustrated in FIG. 1, prior-art nested tension springs 4, 6 use opposing hooks to restrain the spring from releasing from their mount locations. The outer hook 10 opposes the inner hook 8. It is to be noted that the previous tension springs 4, 6 typically failed at the hook most particularly at the location where the large bending stress on the hook met the large torsion stress coming from the coil under a tensile load. The relationship of the hooks 8, 10 to the springs 4, 6 will be better understood after the following description. The operation of the springs 4, 6 may be understood upon reference to FIG. 1. The embodiment consists of two tensions springs 4, 6, an inner spring 4 and an outer spring 6. The above springs 4, 6 connect at hooks 8, 10 on either end. These springs 4, 6 are assembled together so that the coiled spirals are wound in opposing directions. The hooks 8, 10 however, are connected to fixtures in such a manner that upon application of repeated tensile forces the hooks may fail. These hooks 8, 10 do not have a clean or secure attachment. Stress concentrations arise at the fixture or element to which the hooks secure and at the bend in the hooks prior to the windings. Also with the prior art, when one spring fails, the hooks move, often causing the entire system to fail.

To resolve the difficulty noted above, embodiments of the present invention include an inner spring 12 and an outer spring 16 that are connected to fixtures with end mounts 14, 18 in such a manner that upon application of tensile forces there is much less chance for failure and a more secure and clean attachment. These end mounts 14, 18 may be machined from various materials such as metals, plastics, or composites. The relationship of the end mounts 14, 18 to the embodiment will be better understood upon reference to FIG. 2.

Figure 2:
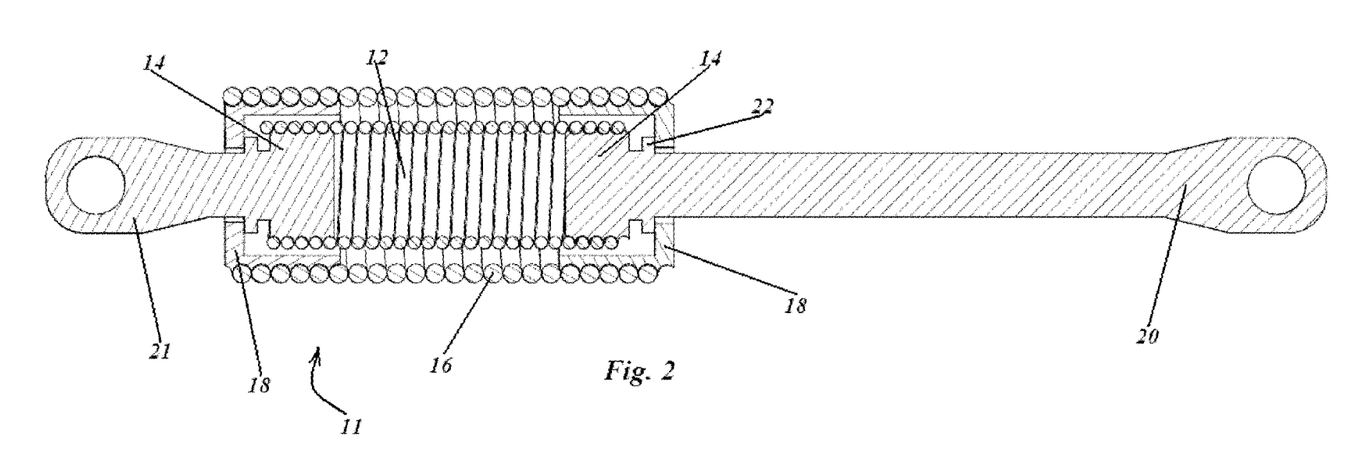
FIG. 2 is a side view of the spring assembly.

As shown in FIG. 2, an inner spring 12 is attached to fixtures 20, 21 with end mounts 14 on either end. Surrounding the inner spring 12 is the outer spring 16 wound onto end mounts 18. Because there is more than one spring in the system, each individual spring can have a lower mass as strength from multiple springs is combined. As a result of the lower mass of each individual spring in the system, the dual-spring embodiment has a higher intrinsic natural frequency. This higher natural frequency adds safety as the frequency is out of the range of frequencies experienced in use. When the apparatus experiences frequencies similar to its natural frequency it can more easily fail. This has been seen in airplane landing gear. Because the natural frequency of the system is higher a measure of safety is added.

Returning to the end mounts 18, the inner diameter of the grooves 28 in end mounts 18 is slightly larger than the resting coil diameter of the outer spring 16. For this reason, coupled with the fact that the mentioned springs are tension springs, as the spring is introduced to tension the spring diameter naturally tends to decrease, however, the end mount 18 forces the coil diameter to remain the same on the end mounts 18. This makes the outer spring 16 compress around the end mount 18, holding it on securely without slippage.

Another advantage these end mounts 18 provide for the embodiment is that if one spring fails the end mounts 14, 18 hold the other spring in the same alignment. With the prior art the hooks 8, 10 move when one spring fails. Such movement can be a problem, especially with a tight space envelope or if the springs are near a fuel tank or other combustible where a spark may be an issue. Furthermore, since conventional fasteners are eliminated, failures are further reduced. There are fewer parts to fail. The bending stresses are minimized and the torsional stresses are spread over multiple coils in the end-mounting region.

Figure 5A:
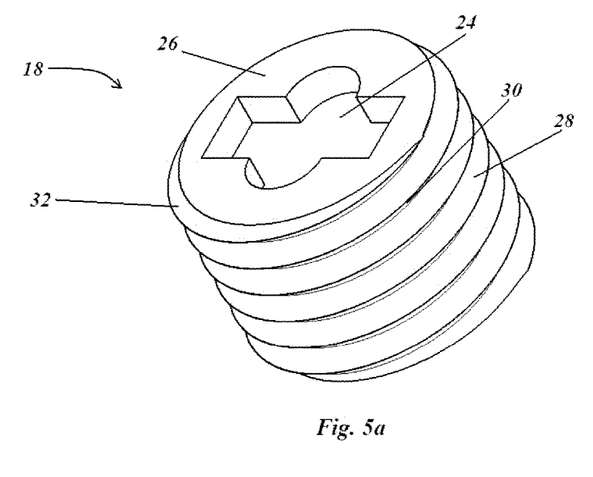
FIG. 5a is an isometric view of the outer spring end mount.
Figure 5B:
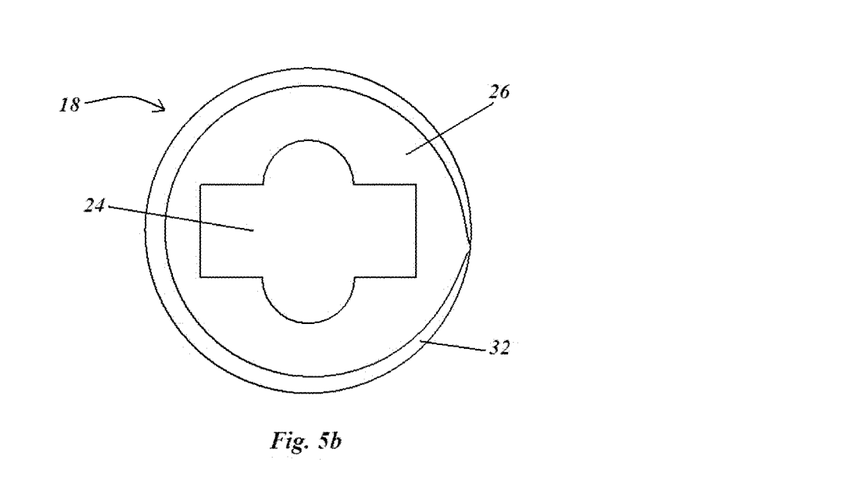
FIG. 5b is an end view of the outer spring end mount having a wider key-hole opening.
Figure 5C:
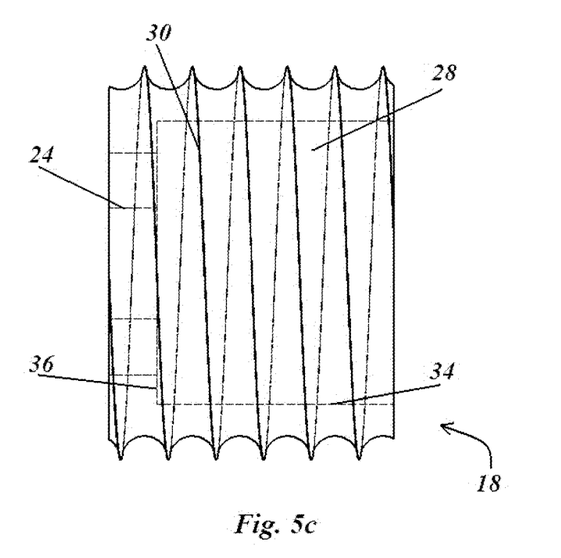
FIG. 5c is a side view of the outer spring end mount.

Turning now to the end mount 18 more specifically as seen in FIG. 5, there is a keyhole 24 created. This keyhole 24 extends through wall 26 of end mount 18 in order that the end mount 18 may fit over the end fixtures 20 and 21 attached to the outer spring. The keyhole 24 has the shape as shown on the wall 26 of the end mount. The hole shape is configured to provide clearance for fitting over one end of the fixture while being small enough to engage the inner spring mount or other stop as discussed below. The wall 26 of the end mount is preferably a flat surface on which a snap ring 22 rests to hold the end mount 18 in place as shown in FIG. 2.

The end mount 18 also preferably has a recess such that it can nest over the inner end mount 14 and the inner spring 12. An inner surface 36 of wall 26 in the end mount 18 rests on the inner end mount 14 or the flange 15, if a flange is used. Alternately to a flange, a separate stop, such as a washer may be used. The shape of the keyhole 24 may be specific to the fixture or can be a fixed shape such as a circle (as in FIG. 5a). The keyhole 24 is created to allow the end mount 18 to fit over the end fixtures 20 and 21 attached to the outer spring 16 so that the spring 16 is able to be wound onto the end mounts 18. Fixtures 20 and 21 attached to the outer spring 16 may vary in shape, size and length depending on need from the desired application.

Also as noted in FIG. 5, the end mount 18 has a taper 32 which then turns into the grooves 28 that the outer spring 16 is wound onto. The grooves 28 are constantly spaced and have a constant diameter. As the spring is wound onto the mount, the force to turn it on tends to enlarge the spring diameter. However, once mounted, the tensile forces during use tend to keep the spring securely mounted.

Figure 3:
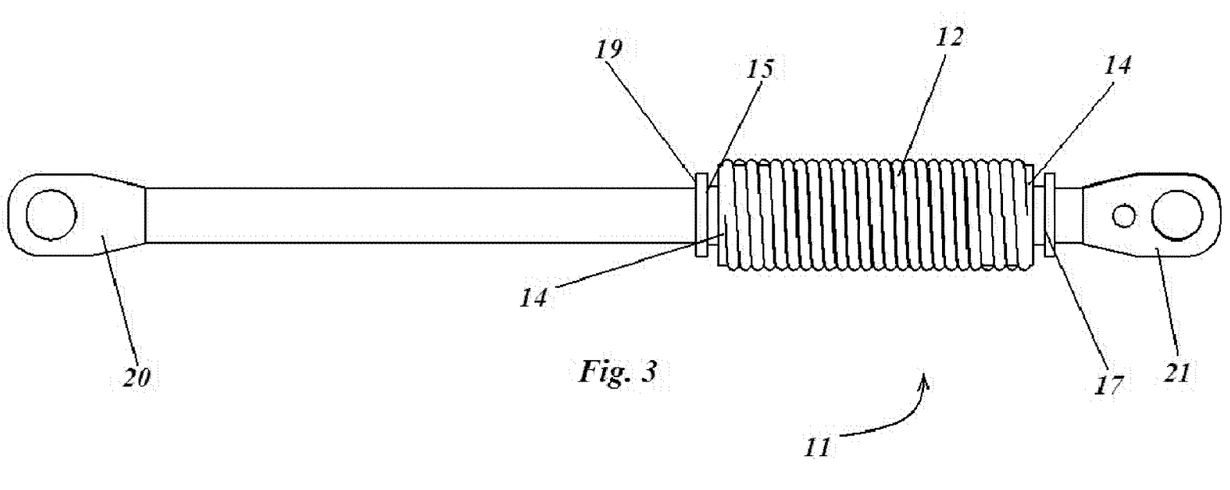
FIG. 3 is a side view of the inner portion spring assembly.

The cylindrical side wall 30 of the end mount 18 is preferably generally constant in diameter along its length, except of course for the variation introduced by the grooves in the outer portion of the wall. The inner hole 34 has a constant diameter that is able to fit over inner end mount 14 and shoulder 15 or 17 (as seen in FIG. 3). However, the inner hole 34 diameter is preferably tight enough around the inner end mount 14 and shoulder 15 or 17 that it does not slide around and come out of place. The inner hole surface 36 is preferably flat and perpendicular to the side wall 30 of the end mount 18. This allows the end mount 18 to rest on the shoulder 15 or the inner end mount 14 securely.

As shown in FIG. 2, the outer spring end mount 18 rests on the inner spring end mount 14. The inner spring end mount 14 has a machined shoulder 17 or a flange 15 with a wall 19, which serves the purpose of holding the outer spring 16 in place and provides a wall 19 for the outer spring end mount 18 to be fixed. As a consequence of having two springs 12 and 16 in the assembly each spring can weigh less because of the added strength of including an additional spring. It is to be noted that the springs 12 and 16 coil in opposite directions. For this reason coupled with the fact that there are two tension springs 12 and 16, great strength is added to the apparatus.

Figure 4:
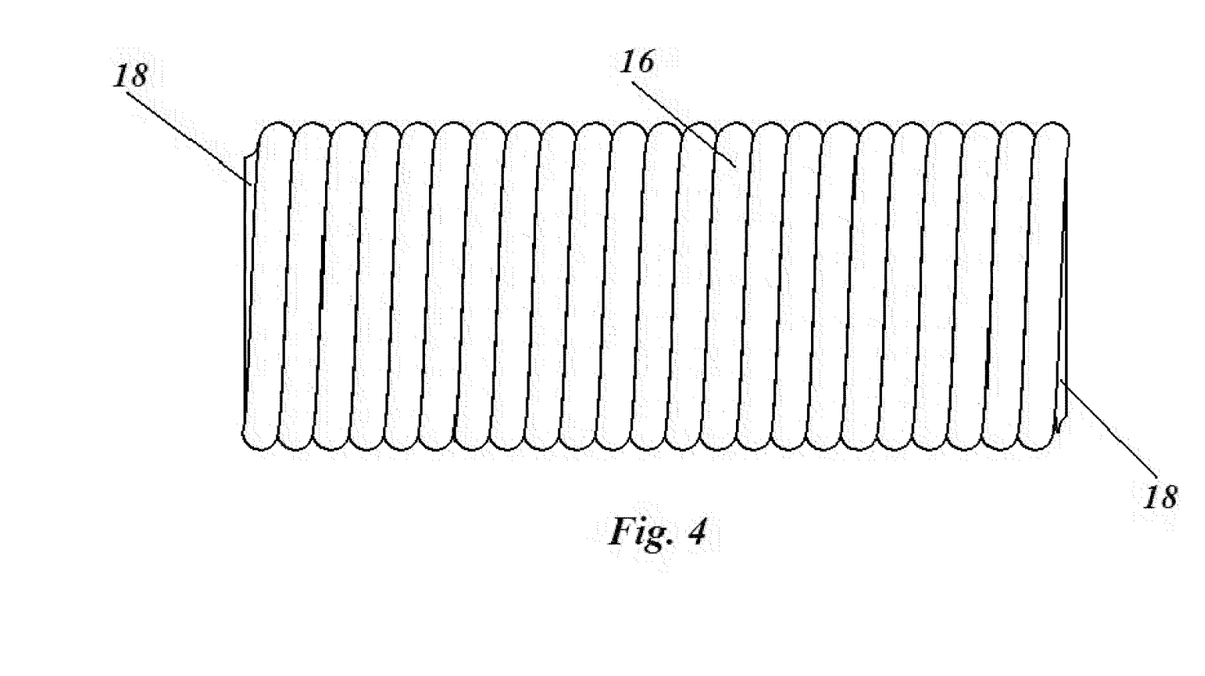
FIG. 4 is a side view of the outer spring assembly.
Figure 6:
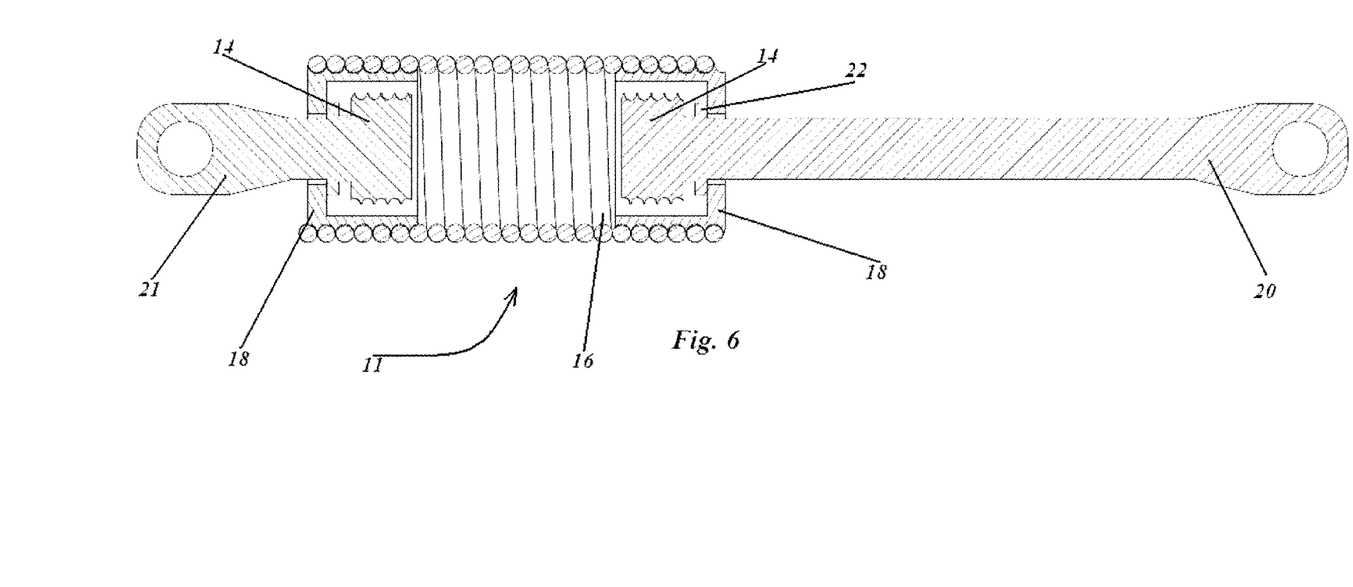
FIG. 6 is a side view of the outer portion spring assembly.

As tension is added to the springs 12, 16 they pull in opposing directions because they are wound oppositely. Incidentally, it will be appreciated that a greater factor of safety is added in the use of two springs 12, 16. As shown in FIG. 3 the apparatus is capable of functioning with the use of only one spring. The fixtures 20 and 21 are still securely connected and the embodiment can still function. Also, as shown in FIGS. 4 and 6, the outer spring 16 can still function if the inner spring 12 fails. If one spring fails, the other one is still present and can function without the other. This added measure of safety is especially important as this device is often used in applications with high stress and multi-directional, vibrating, and/or high speed motion.

While the preferred embodiment of the invention has been illustrated and described, as noted above, many changes can be made without departing from the spirit and scope of the invention. For example, a safety rod could be added for an even higher measure of safety. Thus if both springs 12 and 16 were to fail, the rod would hold the fixtures together. The rod could be attached using keyholes from the rod into the fixtures.

Another example used in the application of securing the outer end mounts 18 could be the use of flanges. These flanges could take the place of the shoulder of the inner end mount. Flanges could be machined directly onto the fixtures 20 and 21 or arm of the fixture 20 and 21 depending on the application. These flanges would then hold the outer end mount 18 in place.

Also, depending on the fixture 20 and 21, differing sizes of outer end mounts 18 and keyholes may be used. In relation to the springs 12 and 16, differing sizes and materials may be used depending on the strength need and the function of the device. Free length, pitch, diameter, coil diameter, and the number of coils may all vary. Similarly the diameter of the outer end mounts 18 may vary depending on the outer spring 16 coil diameter and the size of the fixtures 20 and 21 attached.

The dual-spring system can alternatively be more than two springs, even as many as four or five springs. These do not necessarily have to be nested. They may be secured one next to the other, however, this does not necessarily reduce the space envelope. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A tension spring mount assembly for coupling between a first component and a second component to control movement between the first and second components, the assembly comprising:

a first end fixture being a single integral unit and configured for mounting to the first component, the first end fixture having an inner end and an outer end, the outer end configured for mounting to the first component, the inner end configured for mounting to a first end of a second tension spring and abutment against a first mount body, the inner end of the first end fixture defining first grooves arranged in a helical configuration;

a second end fixture being a single integral unit and configured for mounting to the second component, the second end fixture having an inner end and an outer end for mounting to the second component, the inner end configured for mounting to a second end of the second tension spring and abutment against a second mount body, the inner end of the second end fixture defining second grooves arranged in a helical configuration;

a first tension spring having first and second ends; and the first mount body coupling the first end of the first tension spring to the first fixture inner end, the first mount body having an outer surface and an opening through a portion thereof, beneath the outer surface; the opening configured to fit around the outer end of the first end fixture, the first mount body abutting against the inner end of the first end fixture, the first tension spring biasing the first mount body against the inner end of the first end fixture, wherein the first tension spring is secured about the outer surface of the first mount body, the outer surface of the first mount body defining third helical grooves engaging the first tension spring and having an opposite direction to the first and second grooves.

2. The tension spring mount assembly of claim 1, further comprising the inner end of the first end fixture secured to a second spring, the second spring being at least partially nested within the first spring.

3. The tension spring mount assembly of claim 2, wherein the first inner end of the first end fixture is the stop portion securing the first end mount.

4. The tension spring mount assembly of claim 2, further comprising the second end mount body being coupled between the first spring and the second end fixture, the second end mount body having an outer surface about which the first spring is wound, the second end mount body sliding over the outer end of the second fixture, the inner end of the second fixture abutted against the fixture engagement portion of the second mount body to prevent movement toward the inner end of the second fixture.

5. A system for securing a first tension spring, the system comprising:

a first mount body having curved sides and having a fixture engagement portion extending inwardly from the curbed sides of the first mount body, wherein an opening is formed in the fixture engagement portion;

grooves arranged in a helical configuration on the curved sides of the first mount body for engaging the first tension spring; and a first end fixture being a single integral unit and having an inner end and an outer end, the outer end being directly onto the first end fixture and configured to extend through the opening in the fixture engagement portion, wherein the opening is sized to receive the outer end but not the inner end of the first end fixture, thereby securing the first tension spring to the first end fixture wherein the opening comprises a keyhole including a circular portion having a diameter and a rectangular portion having a first dimension smaller than the diameter and a second dimension larger than the diameter, the second dimension being wider than a width of an eye portion formed in the outer end and the smaller dimension being smaller than the width of the eye portion.

* * * * *